H. A. WENTWORTH.
SPOTTER'S TRAINING DEVICE.
APPLICATION FILED FEB. 18, 1919.
1,352,773.
Patented Sept. 14, 1920.
3 SHEETS—SHEET 1.
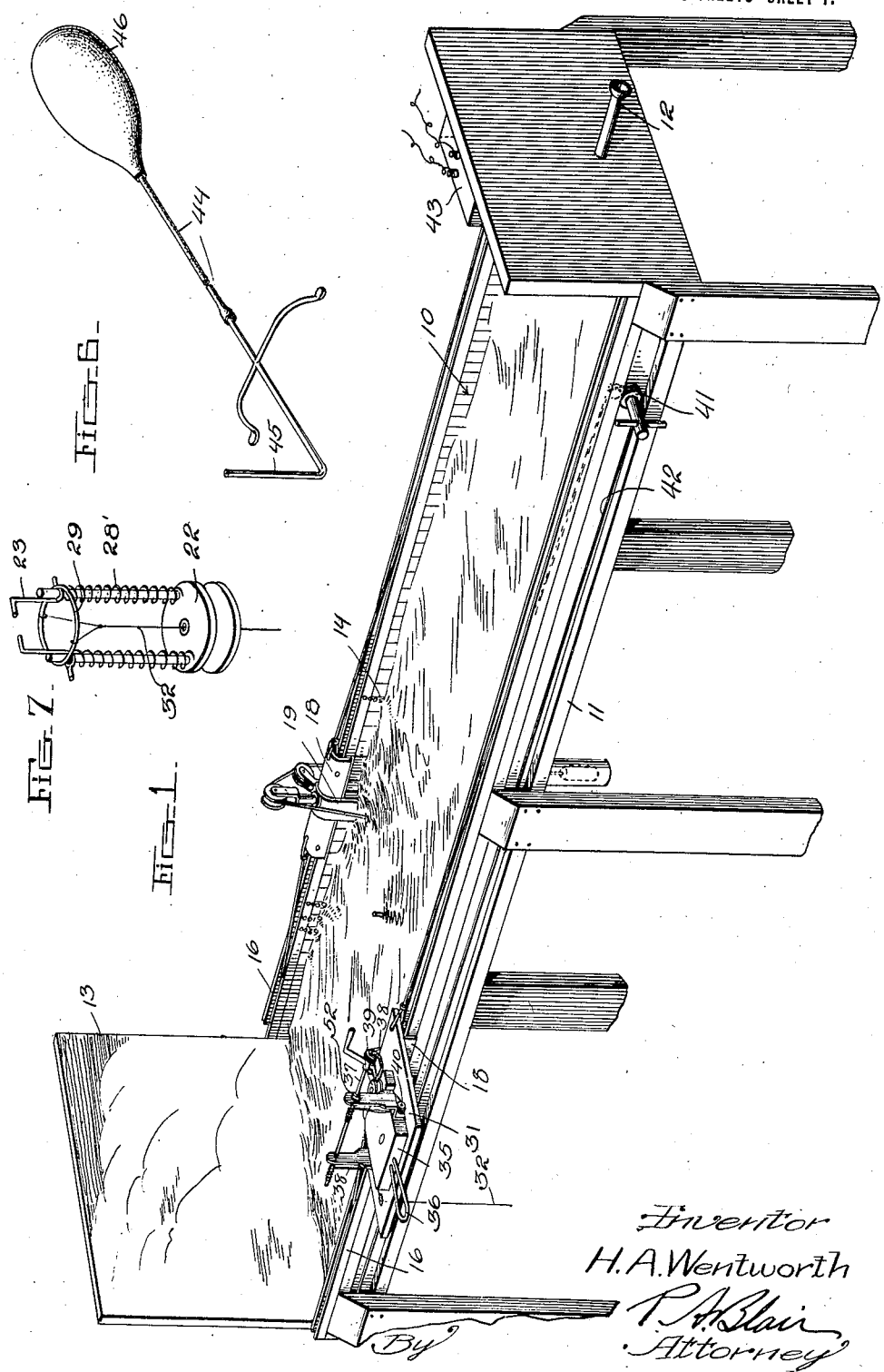
Inventor
H. A. Wentworth
By P. A. Blair
Attorney

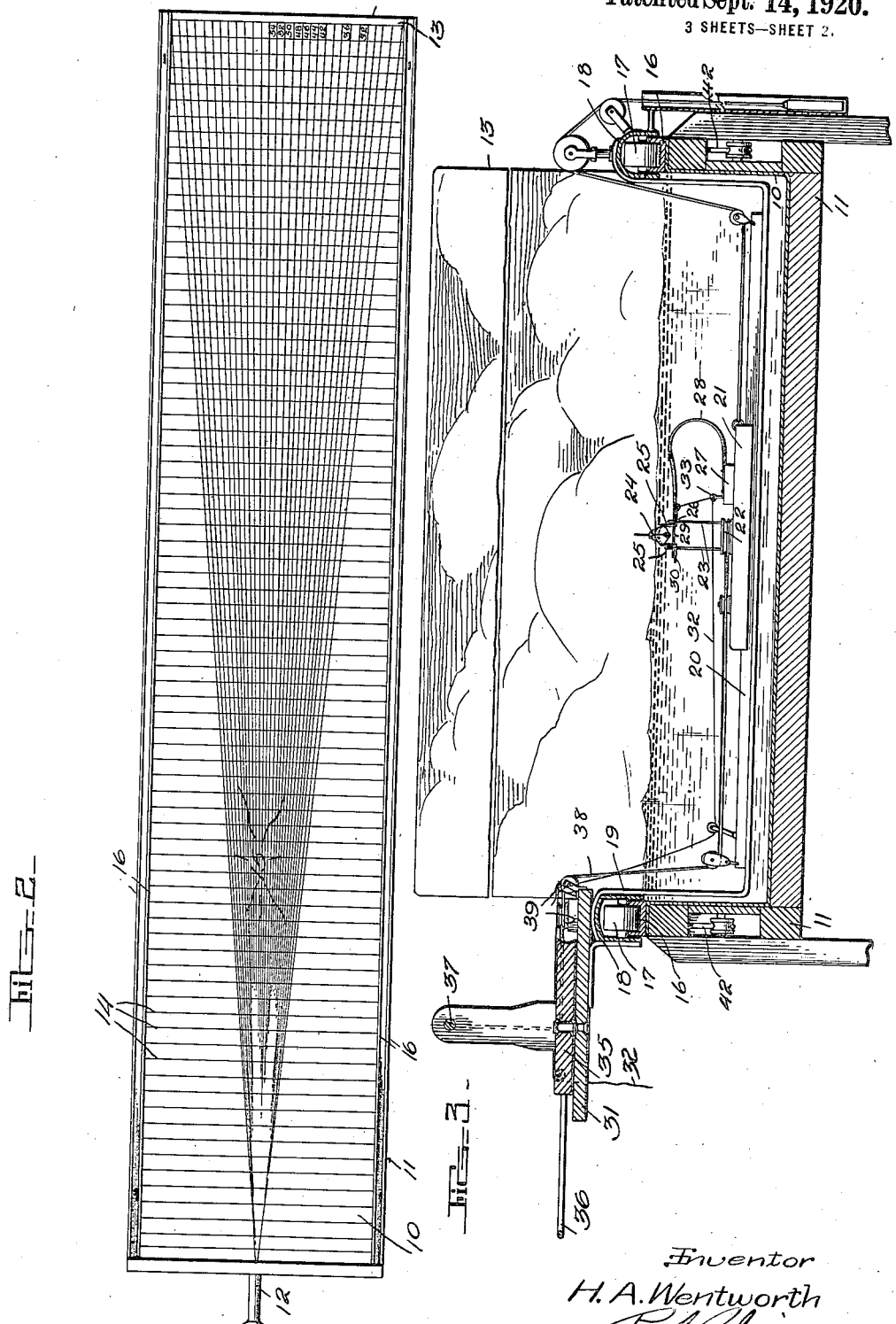

H. A. WENTWORTH.
SPOTTER'S TRAINING DEVICE.
APPLICATION FILED FEB. 18, 1919.
1,352,773.
Patented Sept. 14, 1920.
3 SHEETS—SHEET 3.
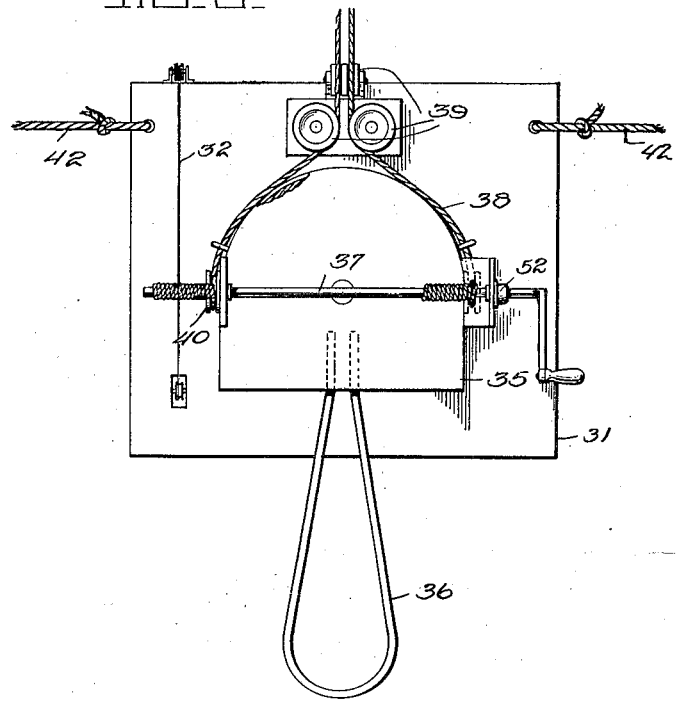
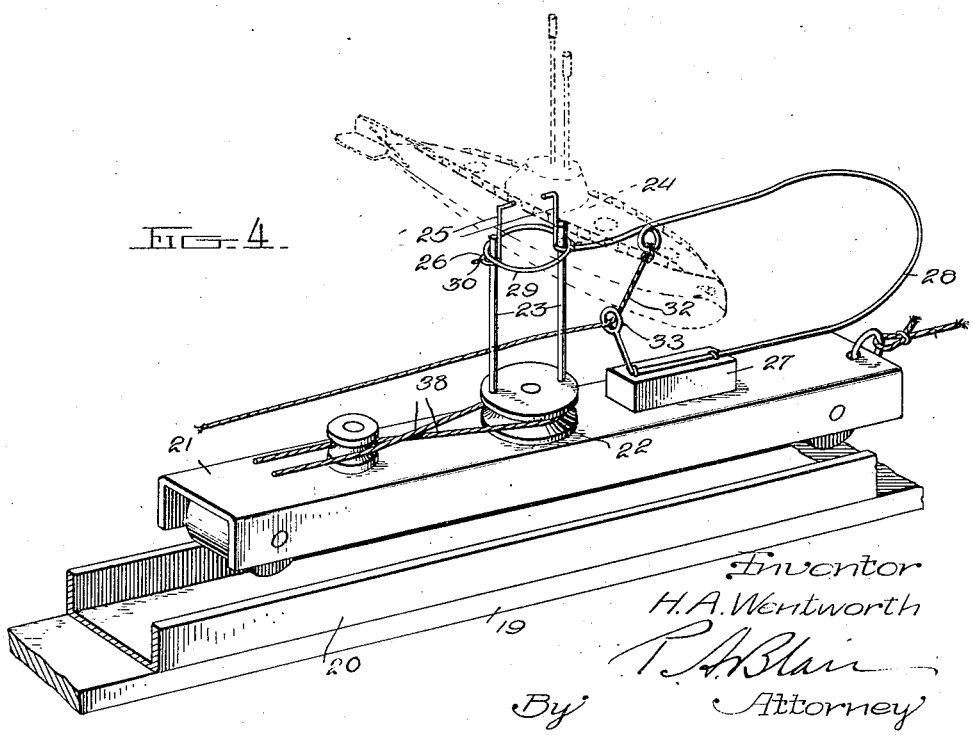

UNITED STATES PATENT OFFICE.

HARRY A. WENTWORTH, OF SPOKANE, WASHINGTON, ASSIGNOR TO THE GOVERNMENT OF THE UNITED STATES.

SPOTTER'S TRAINING DEVICE.

1,352,773.  Specification of Letters Patent.  Patented Sept. 14, 1920.

Application filed February 18, 1919. Serial No. 277,734.

*To all whom it may concern:*

Be it known that I, HARRY A. WENTWORTH, a citizen of the United States, residing at Spokane, Washington, have invented new and useful Improvements in Spotters' Training Devices, of which the following is a specification.

This invention relates to a device for training the sighting numbers or "spotters" of a naval gun crew in determining the location of hostile vessels.

The present invention has as its purpose to provide a device whereby "spotters" may be trained to a high degree of efficiency in determining the range and deflection of hostile vessels, the practice or drill being carried out under conditions simulating those which are met with in actual combat.

To accomplish the purposes of the present invention I provide a device having means for maneuvering and operating a vessel in a tank of water in the same manner as hostile vessels would actually operate. If desired the vessel may represent a miniature submarine, in which instance the vessel would be capable of operating on the surface of a body of water or beneath the surface thereof and be capable of being submerged and brought to the surface at will at any position in the tank. The course of the miniature vessel may be changed to any point of the compass and the vessel may continue on that course as long as desired. It is possible to cause the submarine vessel to double back on its course or it may be caused to make a submerged attack showing its periscope at times and changing its course beneath the surface, the controlling mechanism and the movements of the vessel when submerged being invisible to the "spotter" who sights through a sighting member at one end of the tank but being clearly visible to the instructors. The position of the vessel may be correctly determined at any time by lines plotted on the bottom of the tank, these lines being visible to the operators or instructors so that the latter may readily see the actual position of the vessel at any given time and also indicate to the "spotter" the point at which a projectile would have struck had the gun crew fired the gun in accordance with the determination made by the "spotters".

In the present illustrative disclosure of my invention I have shown but a single target or vessel and this target represents a miniature submarine vessel, but it is to be distinctly understood that the present device is alike applicable to great-gun spotting or to submarine spotting, and that the target may represent a surface vessel, such as a battleship or cruiser, and any number of such targets may be employed simultaneously. For instance, a fleet of six ships may be maneuvered at one time and in any suitable formation, such as "squadron in column", "line of divisions", "ships oblique to any angle", etc. For purposes of description, only, the target is herein referred to as a submarine vessel.

The above and other objects of my invention are obtained in the structure described in detail in the following specification and illustrated in the accompanying drawings, and, wherein:

Figure 1 is a perspective view of my device;

Fig. 2 is a top plan view of the tank of the same;

Fig. 3 is the transverse sectional view taken on a line through the submarine carrier;

Fig. 4 is the perspective view on an enlarged scale of a submarine carrying car;

Fig. 5 is the top plan view on an enlarged scale of the operating means for moving or controlling the movements of the miniature submarine;

Fig. 6 is a perspective view of an instrument for indicating the splash of the imaginary projectile, and Fig. 7 is a perspective view of a part of the submarine carrying elements and shows a slightly different construction.

Referring to the drawings, wherein like reference characters indicate like parts in the several views, 10 designates a shallow elongated tank adapted to contain a body of water and supported by a frame 11. The legs of the tank may be removable to facilitate packing for shipment. For purposes of illustration, it may be stated that tanks about fifteen feet in length, three feet in width and six inches in depth have been employed for submarine spotting, while for great-gun spotting, tanks sixty feet long, twelve feet wide, and eleven inches deep have been used, but, of course, it is evident that these dimensions may be varied as found most suitable in practice. At one end of the tank is a sighting member or tube 12 which is located at a height above the surface of the water in accordance with the miniature scale on which the device is constructed and this height may represent thirty feet. At the other end of the tank is the screen or bulkhead 13 on which a sky background is painted giving the effect of a cloudy or hazy horizon.

Upon the bottom and the inside surfaces of the sides of the tank 10 are plotted lines indicating ranges and deflection the range lines, designated by the numerals 14, extending transversely of the tank and the deflection lines designated by numerals 15 extending longitudinally thereof and these latter lines converge toward the sighting member 12, as most clearly shown in Fig. 2. The range and deflection lines may be plotted or laid off in accordance with any selected scale of measurement, but, for illustrative purposes, it may be assumed that in a tank fifteen feet long and three feet wide, a scale of one foot equals five hundred yards is adopted in which instance the range lines may be two and two-fifths inches apart to represent one hundred yards, and the lines of deflection may be one-fourth of an inch apart at fifteen hundred yards, one-half inch apart at three thousand yards and one inch apart at six thousand yards from the sighting member 12. The interior of the tank is preferably painted dark green and the range and deflection lines are marked off with yellow paint, with two coats of spar-varnish applied over all.

Upon the upper edge of each side of the tank is a rail 16 which may comprise a channel iron, the channels facing upward so as to form grooves in which engage the rollers 17 of the side cars 18 of a submarine supporting carriage. Each of the side cars 18 comprises, in part, an inverted channel iron of greater width than the rails 16 and between the side flanges of the cars the rollers 17 are journaled.

The numeral 19 designates a strip connected at its opposite ends to the side cars 18 and so arranged intermediate its ends that it depends into the tank and just clears the bottom thereof. Secured to the straight horizontal portion of the strip 19 is a rail 20 upon which rides in a directon transverse to the length of the tank 10, a submarine carrying car 21, the rail 20 and the central car 21 being similar in construction to the rails 16 and the cars 18 respectively heretofore described. Pivotally mounted on the central car 21 is a drum 22 having a peripheral groove and from this drum arises in parallelism two stanchions 23 between which a miniature vessel, such as the submarine 24, is adapted to float. The miniature vessel 24, which, as stated, may represent a submarine or surface vessel, is associated with the stanchions 23 by means of a pair of wires 25, the submarine 24 being carried by the upper ends of these wires and the lower ends of the wires being provided with loops or rings 26 which loosely receive the stanchions 23 so that sufficient play is allowed to permit surface disturbances of the water within the tank to cause the submarine to roll or pitch slightly. To use the device for spotting battleships, the submarine may be lifted out and a battleship substituted. Carried by the central car 21 is a block 27 to which is secured one end of a wire spring 28, the wire spring being bent back upon itself and being provided at its free end with a ring or loop 29, which loop encircles the two stanchions just beneath the bottom of the submarine 24. Extending outwardly from the rings 26 of the wires 25 are fingers or lugs 30 which are engaged by the loop 29 when the spring 28 is flexed downwardly by the means hereinafter described, and thus the vessel 24 may be submerged at any time. If desired, the spring 28, shown in Figs. 3 and 4, may be replaced by two coiled springs 28', (Fig. 7), positioned about the stanchions 23, in which case the cord 32 is connected to the loop 29 and passed through a small hole in the securing bolt of the drum 22 and over suitable pulleys on the bottom of the car to the shelf 31.

Carried by one of the cars 18 is a shelf 31 from which the transverse movement of the carriage 21, the course of the submarine, and the depth of the submarine within the body of water are controlled. Connected to the spring 28 is a cord 32 which passes through an eye 33 carried by the block 27, through properly located sleeves to the shelf 31, and through a hole therein so that the end of the cord hangs below the shelf and a downward pull exerted thereon will submerge the vessel. It will be understood that when the cord 32 is drawn toward the operator standing adjacent the shelf 31, the free end of the spring will be flexed downwardly thus causing the loop 29 to engage the lugs 30 and move the wires 25, together with the submarine 24 carried thereby downwardly to the desired depth, the depth depending on whether or not it is intended to entirely submerge the submarine or to only show a portion of its periscope. When the cord 32 is released the spring 28 springs upwardly and the submarine 24 will float to the surface of the water within the tank 10.

Rotatively mounted upon the shelf 31 is the platform 35, the forward portion of which is semi-circular and provided with a peripheral groove. The platform 35 is adapted to be turned by means of a handle 36. Mounted upon the platform 35 is a windlass 37. The numeral 38 designates a a cord passing about the drum 22 and each end of this cord is rove through suitable pulleys 39 around the grooved semi-circular portion of the platform 35 and about the sheaves 40 to the windlass 37 to which the ends are secured. It will be understood that upon turning the platform 35, the drum 22 will be turned or rotated and thereupon the course of the submarine is changed to the desired point of the compass. Upon operation of the windlass 37, the cord 38 will be heaved in or slacked out causing the car 21, together with the submarine carried thereby, to move transversely of the tank. The numeral 50 designates a counter weight connected by means of a cable to the car 21 and this weight may be inclosed in a tube 51 carried by the side car 18 to prevent the weight from swinging when the device is in operation. A brake 52 may be installed on the windlass for preventing the windlass from turning when the turntable 35 is rotated by handle 36.

For the purpose of moving the submarine supporting carriage longitudinally of the tank, a windlass 41, which may be located at either end of the tank 10, is provided and about this windlass passes a rope 42, the ends of which are connected to the shelf 31 thus making an endless fall. If desired, the rope 42 may be replaced by a sprocket chain, passing over suitable sprocket wheels.

For the purpose of simulating the same conditions as are actually met with in practice, so that the "spotters" will be trained under the most favorable circumstances, it is preferable that means be provided for setting up waves in the water within the tank and to this end a paddle, preferably installed in the corner of the tank nearest the "spotter's" position, is provided and preferably the paddle is inclosed in a hood 43 to prevent the water from splashing into the line of vision of the "spotter." The paddle is not shown in the present illustrative disclosure, as it may be of any suitable construction. It is preferably motor driven and can be regulated to cause a moderate ripple on the surface of the water or a fairly large swell which, in proportion to the distance and dimensions, is equal to the average sea disturbances encountered in actual naval warfare.

The operation of my device will be readily understood from the foregoing description. The "spotter" takes his position at one end of the tank and sights through the tube 12. The submarine is moved longitudinally of the tank upon operation of the windlass 41 while the transverse movement of the submarine is effected by operation of the windlass 37 and by combining these longitudinal and transverse movements the submarine may be moved in any direction and while so moving its course to any point in the compass may be changed at will by rotating the platform 35. The submarine may be brought into a submerged position by exerting a pull upon the cord 32 and while so submerged or partly submerged the course of the submarine and its direction of movement may be varied as desired. The "spotter" at a given instant estimates the position of the submarine giving its position in range and deflection. The instructors will thereupon note the exact position of the submarine, this being easily done as the range and deflection lines 14 and 15, respectively, are visible to the instructors. To indicate to the "spotter" the error which he has made in his determinations an operator or instructor may indicate the point at which the imaginary projectile would have struck the surface of the water had a projectile been fired in accordance with these determinations and for this purpose the instrument shown in Fig. 6 is provided whereby the splash of the imaginary projectile may be effected. The instrument shown in Fig. 6 comprises a tube 44, a portion of which may comprise a flexible rubber section, one end 45 of this tube being bent so that when this end of the tube is in the water it is vertical to the surface of the water and about one-eighth of an inch below the surface thereof. The other end of the tube 44 has a syringe or rubber bulb 46. The instructor places the bent end 45 of the splash instrument at the point at which the "spotter's" imaginary projectile would have struck and by squeezing the bulb a small geyser of water is thrown up. It will thus appear obvious that my invention may also be used to train spotters by simulating splashes of projectiles in the vicinity of the target whereby the spotter may learn to determine the relative location of the splashes with respect to the target in order to apply corrections in range or deflection.

If desired, the spotting device may be connected to drill guns by fire control telephone systems. Ranges are sent to the guns as given by the spotter. The splash (for the fall of the shot) is not registered until the sight-setter has returned "Set" over the phone. In this manner each commander has his own crews at the guns and conditions are made as realistic as possible. The time is recorded in which each crew mans the guns, fires the first shot, registers the first shot, etc. If desired, daily records of the respective crews' work may be kept and improvements may be noted therefrom from day to day in their spotting.

It, of course, is obvious that my invention is susceptible to various modifications and changes which would be within the spirit of the invention without departing from the scope of the following claims, it being understood that the present disclosure is by way of illustration only and it is not to be taken to be restrictive of my conception.

What I claim is:—

1. In a training device, a support, a target associated therewith, and means for moving said target in any desired direction with respect to said support.

2. In a training device, a support, a sighting member associated therewith, a target carried by the support, and means for moving said target in any desired direction with respect to said support.

3. In a training device, a support, a target associated therewith, means for moving said target to any desired position on said support, and means for indicating the position of the target.

4. In a training device, a support, a sighting member associated therewith, a target carried by the support, means for moving said target to any desired position on said support, and means for indicating the position of the target.

5. In a training device, a support, a target associated therewith, and means for imparting a plurality of movements to said target to any position on said support.

6. In a training device, a plotted surface, a sighting member, a target movable over said plotted surface, and means for giving any desired movement to said target.

7. In a training device, a surface plotted to indicate ranges and deflections, a sighting member at one end of and slightly above said surface, a miniature vessel movable over said plotted surface, and means for causing the vessel to simulate the movements of a real vessel.

8. In a training device, a surface plotted to indicate ranges and deflections, a sighting member, a miniature vessel movable over said plotted surface, means for changing the course of said vessel to any point of the compass and means for causing the vessel to simulate the movements of a real vessel.

9. In a spotter's training device, a tank containing a body of water, a sighting member associated therewith, a target within said tank and means for moving said target in any desired direction within said tank.

10. In a spotter's training device, a tank containing a body of water, a sighting member associated therewith, a target supported within said tank, and means for submerging said target.

11. In a device of the class described, a plotted surface, a body of water over said surface, a sighting member, a target movable in the body of water, and means for moving said target.

12. In a spotter's training device, a tank, a body of water within the tank, a target movable in the body of water, and means associated with the tank for simulating visual and marine conditions encountered in actual practice by the spotter.

13. In a spotter's training device, a plotted surface, a body of water over said surface, a sighting member, a miniature submergible vessel, and means for causing said vessel to simulate all of the movements of a real vessel, means for causing waves on the surface of said body of water, and means for indicating the splash of an imaginary projectile.

14. In a spotter's training device, a plotted surface, a layer of water over said surface, a sighting member, a target movable in the body of water, means for moving said target, and means for indicating the splash of an imaginary projectile.

15. In a spotter's training device, a tank containing a body of water, a sighting member associated therewith, a target movable in said body of water, means for moving the target horizontally and means for submerging said target.

16. In a spotter's training device, a tank containing a body of water, a sighting member associated therewith, a submergible target within said tank, means for moving the target horizontally, means for changing the course of the target and means for submerging the target to any desired depth.

17. In a spotter's training device, a plotted surface, a body of water over said surface, a sighting member, a miniature submergible vessel, a means for moving the vessel horizontally in any direction, means for changing the course of the vessel, and means for submerging the vessel to any desired depth.

18. In a spotter's training device, a tank of water, lines on the bottom of the tank representing ranges and deflection, a sighting member, a carriage movable longitudinally of the tank, a car carried by the carriage and movable transversely of the line of sight, a target carried by said car, means for moving the carriage, and means carried by the carriage for moving said car.

19. In a spotter's training device, a tank containing a body of water, lines plotted on the bottom of the tank to indicate ranges and deflection, a carriage movable longitudinally of the tank, a car carried by the carriage beneath the surface of the water, a submergible target pivoted on a vertical axis on said car and having vertical movement thereon, means for moving the carriage longitudinally of the tank, means for moving the car transversely of the tank, means for changing the course of the target, means for carrying the depth of the target within the water, and a sighting member at one end of the tank.

20. In a spotter's training device, a tank of water, lines in the bottom of the tank representing ranges and deflection, a sighting member, a carriage movable from and toward said sighting member, a car carried by the carriage and movable transversely of the line of sight, a miniature submergible vessel carried by said car, means for moving the carriage, means carried by the carriage for moving said car, means for causing waves on the surface of the water, and means for indicating the splash of an imaginary projectile.

21. In a spotter's training device, a tank containing a body of water, lines plotted on the bottom of the tank to indicate ranges and deflection, a rail on each side of said tank, a car on each rail, a strip between the cars and having a portion depending into the tank and beneath the surface of the water, a rail on said strip, a car on said last mentioned rail, a drum pivoted on said car, a stanchion arising from said drum, a miniature submarine rotatable with said drum and having a vertical and rocking movement on said stanchion, means for moving the said first cars and strip longitudinally of the tank, means for moving the submarine carrying car transversely of the tank, means for rotating said drum and thus changing the course of the submarine, means for varying the depth of the submarine within the water, and a sighting member at one end of the tank.

22. In a spotter's training device, a tank containing a body of water, a sighting member associated therewith, a target within said tank, means for moving said target in any direction within said tank and means for indicating the position of said target at any given time.

23. In a spotter's training device, a tank containing a body of water, a sighting member associated therewith, a target within said tank, means for moving said target in any desired direction within said tank, means for determining the actual position of the target at any given time, and means for indicating the position of said target as determined by the spotter.

24. In a spotter's training device, a tank containing a body of water, a sighting member associated therewith, a target within said tank, means for submerging said target at any desired location, means for determining the actual position of said target at any given time, and means for indicating the position of the target as determined by the spotter.

25. In a training device, a support, a target associated therewith, means for moving said target in any desired direction with respect to said support and means for indicating the position of said target at any given time.

26. In a training device, a support, a sighting member associated therewith, a target carried by said support, and means for imparting a plurality of movements to said target at any position on said support.

27. In a training device, a support, a sighting member associated therewith, a target carried by said support, and means for moving said target in any direction with respect to said sighting member.

28. In a training device, a support, a sighting member associated therewith, a target carried by said support, means for moving said target in any direction with respect to said sighting member, and means for indicating the position of the target.

29. In a training device, a support, a sighting member associated therewith, a target carried by the support, and means for imparting a plurality of movements to said target to any position with respect to said sighting member.

30. In a training device, a support, a sighting member associated therewith, a target carried by said support and means for moving said target in any direction with respect to the support and said sighting member.

31. In a training device, a support, a sighting member associated therewith, a target carried by said support, means for moving said target in any direction with respect to the support and said sighting member, and means for indicating the position of the target.

32. In a spotter's training device, a tank containing a body of water, a sighting member associated therewith, a target within said tank, and means for moving said target within the tank in any direction with respect to said sighting member.

33. In a spotter's training device, a tank containing a body of water, a sighting member associated therewith, a target within the tank, means for moving said target within the tank in any direction with respect to said sighting member, and means for indicating the position of the target.

34. In a spotter's training device, a tank containing a body of water, a sighting member associated therewith, a target within said tank, means for moving said target within the tank in any direction with respect to said sighting member, means for determining the actual position of the target at any given time, and means for indicating the position of the target as determined by the spotter.

35. In a training device, a support, a sighting member associated therewith, a target carried by said support, means for moving said target in any desired direction with respect to the support, and means for indicating the position of the target at any given time.

36. In a training device, a support, a target associated therewith, and means associated with the support for moving said target to any desired position on said support.

37. In a spotter's training device, in combination, a main support, a target mounted thereon, means whereby the target may be moved on said support, and means operable by a trainer to simulate splashes in the vicinity of the target, the relative location of which is to be determined by the spotter.

38. The method of training spotters which consists in observing at relatively short range a miniature target movable within a restricted area, calculating the position of said target at any given time, and simulating splashes of projectiles near the miniature target to indicate the calculated position of the target with respect to the true position thereof.

39. The method of training spotters which consists in simulating splashes of projectiles in the vicinity of a miniature target movable within a restricted area and at relatively close range and determining the relative location of the splashes with respect to said miniature target whereby corrections in range or deflection may be applied.

Signed at New York city, N. Y., Nov. 16th, 1918.

HARRY A. WENTWORTH.